United States Patent [19]
Suganuma et al.

[11] Patent Number: 5,936,314
[45] Date of Patent: Aug. 10, 1999

[54] FAILURE DETECTING DEVICE FOR A POWER SUPPLY CHANGEOVER SWITCH

[75] Inventors: Hideaki Suganuma; Masahiko Hibino, both of Susono; Shinji Ikeda, Mishima, all of Japan

[73] Assignee: Toyota Jidosha Kabushiki Kaisha, Aichi, Japan

[21] Appl. No.: 08/931,301

[22] Filed: Sep. 16, 1997

[30] Foreign Application Priority Data

Sep. 19, 1996 [JP] Japan .................................... 8-247894

[51] Int. Cl.⁶ ........................................................ B60L 1/00
[52] U.S. Cl. .......................... 307/10.1; 60/300; 219/205; 320/DIG. 10
[58] Field of Search ..................... 307/9.1, 10.1, 307/38, 39, 41, 130, 139, 140, 153; 60/300, 284; 219/202, 205; 361/18, 21, 52; 340/455; 392/485, 491; 320/137, 165, DIG. 10; 324/522, 537; 322/62–64

[56] References Cited

U.S. PATENT DOCUMENTS

| | | | |
|---|---|---|---|
| 4,084,126 | 4/1978 | Clements | 219/202 |
| 5,404,720 | 4/1995 | Laing | 60/300 |
| 5,512,789 | 4/1996 | Lyon | 307/10.1 |
| 5,553,451 | 9/1996 | Harada et al. | 60/300 |
| 5,645,745 | 7/1997 | Hartwick et al. | 219/202 |
| 5,811,884 | 9/1998 | Matuoka et al. | 307/10.1 |

FOREIGN PATENT DOCUMENTS

| | | |
|---|---|---|
| 52-111131 | 9/1977 | Japan . |
| 55-63600 | 5/1980 | Japan . |
| 55-157942 | 12/1980 | Japan . |

Primary Examiner—Richard T. Elms
Attorney, Agent, or Firm—Keyon & Keyon

[57] ABSTRACT

A battery and an electrically heated catalytic converter (EHC) are connected to an alternator in a parallel arrangement via a changeover switch. The changeover switch operates between a first position where it connects the battery to the alternator and a second position where it connects the EHC to the alternator. An electronic control unit (ECU) is provided for controlling the changeover switch and the alternator. When the changeover switch is to be switched between the first and the second position, the ECU first terminates the power generation of the alternator before it actually switches the changeover switch in order to reduce the electric current flowing through the switch. In the switching operation of the changeover switch from the first position to the second position, the ECU determines that sticking of the changeover switch at the first position occurs if the output voltage of the alternator does not become lower than a predetermined value when a predetermined time has lapsed after the switching operation started.

5 Claims, 4 Drawing Sheets

FAILURE DETECTING DEVICE FOR A POWER SUPPLY CHANGEOVER SWITCH

BACKGROUND OF THE INVENTION

1. Field of the Invention

The present invention relates to a failure detecting device which is capable of detecting a failure of a power supply changeover switch such as sticking of contacts of the switch.

2. Description of the Related Art

In a power supply system provided with an electric generator and a battery charged by the generator, such as a power supply system for a vehicle, a power supply changeover switch (hereinafter referred to as "a changeover switch") is used for supplying electric power to a specific electric load (a load such as an electric heater which consumes a large electric power). In this type of the system, the changeover switch disconnects the battery from the generator and directly connects the large electric load to the generator so that electric power is directly supplied from the generator to the large electric load.

This type of the power supply system is, for example, disclosed in Japanese Unexamined Patent Publication (Kokai) No. 52-111131. The '131 publication discloses a power supply system for a vehicle which supplies electric power to an electric heater of a defogger for removing fog and ice from a windshield of the vehicle. In the system of the '131 publication, the defogger is directly connected to a generator of the vehicle when the defogger is activated, and a battery is disconnected from the generator in order to supply a large electric power to the defogger.

In general, when a battery is connected to a generator, an output voltage of the generator is controlled to a predetermined battery charging voltage in order to prevent an overcharging of the battery. Therefore, if a large electric load such as a defogger and the battery are connected to the generator at the same time, the output voltage of the generator must be controlled to a relatively low value (i.e., the charging voltage). In this case, since the output voltage of the alternator is low, the electric current and electric power supplied to the electric load also becomes low. This causes insufficient heat generation of the heater in the defogger and a time required for removing fog and ice is prolonged. In the system of the '131 publication, it may be possible to set the resistance of the heater in the defogger at a low value to supply a large electric power to the defogger even in a low voltage condition. However, in this case, since the output power of the generator is relatively low due to its low output voltage, the generator cannot supply sufficient electric power to the defogger, and the battery must supply electric power to the defogger in order to make up the shortage of electric power required by the defogger. Therefore, a wear of the battery may occur due to an increased load of the battery.

In order to solve this problem, the system in the '131 publication disconnects the battery from the generator when the defogger is activated so that the output voltage of the generator can be raised. By raising the output voltage, since the output power of the generator increases accordingly, a sufficient electric power is supplied to the defogger. Further, since the battery is disconnected from the generator, the overcharging of the battery does not occur even though the output voltage of the generator is raised. Namely, in the system of the '131 publication, a large electric power can be supplied to a specific load without increasing the load of the battery.

In the system which selectively connects a battery and a specific load to the generator as disclosed in the '131 publication, a changeover switch is used for switching the connections between the battery, the specific load and the generator. In general, a large capacity mechanical switch (relay switch) is used in order to switch a large electric current. However, since a large electric current must be cut off instantaneously in the changeover switch, sticking of the switch sometimes occurs due to welding of the contacts or other causes. If the sticking of the contacts of the changeover switch occurs at the position where it connects the electric load to the generator, for example, the electric load may be overheated due to an excessive power supply and, since the battery is not charged by the generator, an excessive discharge of the battery may occur. Further, if the sticking of the changeover switch occurs at the position where it connects the battery to the generator, electric power is not supplied to the load and, in addition to that, overcharging of the battery may occur due to the raised output voltage of the generator.

Therefore, it is important to detect the failure of the changeover switch such as the sticking of the contacts when the changeover switch is used in the power supply system. Although it is important, no consideration is given to the problem of detecting the failure of the changeover switch in the '131 publication.

SUMMARY OF THE INVENTION

In view of the problems in the related art as set forth above, the object of the present invention is to provide a failure detecting device for a power supply changeover switch which is capable of detecting a failure of the switch correctly using a simple detecting method.

This object is achieved by a failure detecting device for a power supply changeover switch according to one aspect of the present invention, which comprises an electric generator, a battery, an electric load, a switching control means for turning on a changeover signal when it is required to supply electric power to the electric load, a power supply changeover switch connected to the electric generator, the battery and the electric load, and operating between a first position where it connects the battery to the generator and a second position where it connects the electric load to the generator, wherein the power supply changeover switch takes the second position when the changeover signal from the switching control means is turned on, and takes the first position when the changeover signal is turned off, an output voltage regulator which terminates power generation by the generator for a predetermined changeover period when the changeover signal has been turned on and a failure determining means for determining that the power supply changeover switch has failed if an output voltage of the generator is higher than a predetermined value when a predetermined time which is shorter than the changeover period has lapsed after the changeover signal was turned on.

According to this aspect of the invention, power generation of the generator is terminated for a predetermined period when the changeover switch is switched so that the switching of the changeover switch is performed in a condition wherein the electric current flowing through the switch is sufficiently low in order to protect the switch. Since power generation of the generator is terminated, the output voltage of the generator (i.e., a voltage of an output terminal of the generator) should become very low after the changeover signal is turned on if the switching of the changeover switch from the first position (the position where the switch connects the battery to the generator) to the second position (the position where the switch connects the electric load to the generator) is normally performed. However, if the changeover switch sticks at the first position, the connection of the battery and the generator output terminal is maintained even though the changeover signal is turned on. In this case, since the battery voltage is imposed on the output terminal of the generator, the output voltage of the generator does not become lower than the voltage of the battery even though the power generation of the generator is terminated. Therefore, it can be determined that the changeover switch has failed, i.e., the changeover switch is stuck at the first position, if the output voltage of the generator does not become lower than a predetermined value (for example, a minimum voltage of the battery) when a predetermined period (for example, the time required for changeover switch to complete the switching from the first to the second position) has elapsed after the changeover signal was turned on.

According to another aspect of the present invention, there is provided a failure detecting device for a power supply changeover switch which comprises an electric generator, a battery, an electric load, a switching control means for turning on a changeover signal when it is required to supply electric power to the electric load, a power supply changeover switch connected to the electric generator, the battery and the electric load, and operating between a first position where it connects the battery to the generator and a second position where it connects the electric load to the generator, wherein the power supply changeover switch takes the second position when the changeover signal from the switching control means is turned on, and takes the first position when the changeover signal is turned off, an output voltage regulator which controls an output voltage of the generator so that a voltage of the battery becomes a predetermined charging voltage when the changeover signal is off and controls the output voltage of the generator to a voltage higher than the charging voltage when the changeover signal is on and a failure determining means for determining that the power supply changeover switch has failed if a voltage of the battery is higher than a predetermined upper limit voltage when the changeover signal is on.

According to this aspect of the invention, the failure detecting device utilizes the fact that the output voltage of the generator is raised in order to supply a large electric power to detect the failure of the changeover switch. The output voltage of the generator is controlled to a voltage higher than the normal charging voltage of the battery when the changeover signal is on. Therefore, if the changeover switch sticks at the first position where it connects the battery to the generator, the voltage of the battery becomes higher than the normal charging voltage when the changeover signal is turned on because the output voltage of the generator is raised by the changeover signal. Thus, it can be determined that the changeover switch is stuck at the first position if the voltage of the battery is higher than a predetermined upper limit voltage (a voltage higher than the normal charging voltage by a certain amount) when the changeover signal is on.

According to another aspect of the present invention, there is provided a failure detecting device for a power supply changeover switch which comprises an electric generator, a battery, an electric load, a switching control means for turning on a changeover signal when it is required to supply electric power to the electric load, a power supply changeover switch connected to the electric generator, the battery and the electric load, and operating between a first position where it connects the battery to the generator and a second position where it connects the electric load to the generator, wherein the power supply changeover switch takes the second position when the changeover signal from the switching control means is turned on, and takes the first position when the changeover signal is turned off, an output voltage regulator which controls an output voltage of the generator so that a voltage of the battery becomes a predetermined charging voltage when the changeover signal is off and controls the output voltage of the generator to a voltage higher than the charging voltage when the changeover signal is on and a failure determining means for determining that the power supply changeover switch has failed if an output voltage of the generator is higher than a predetermined upper limit voltage when a predetermined time has lapsed after the changeover signal was turned off.

According to this aspect of the invention, the failure detecting device utilizes the fact that the output voltage of the generator is controlled in accordance with the voltage of the battery when the changeover signal is off to detect the failure of the changeover switch. When the changeover signal is off, the output voltage regulator raises the output voltage of the generator if the voltage of the battery is lower than the charging voltage, and lowers the output voltage if the voltage of the battery is higher than the charging voltage. Therefore, if the changeover switch sticks at the second position where it connects the electric load to the generator, the output voltage of the generator is controlled in accordance with the voltage of the battery though the battery is not connected to the generator. In this case, since the voltage of the battery stays at the value lower than the charging voltage even though the output voltage of the generator is raised, the output voltage regulator continues to raise the output voltage of the generator in order to raise the voltage of the battery and the output voltage of the generator rises to its maximum value. Therefore, it can be determined that the changeover switch is stuck at the second position if the output voltage of the generator is still higher than a predetermined voltage (a voltage higher than the charging voltage by a certain amount) when a predetermined time (for example, the time required for controlling the output voltage of the generator to the charging voltage when the changeover switch is normal) has elapsed.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Hereinafter, an embodiment of the present invention will be explained in detail with reference to the accompanying drawings.

Figure 1:
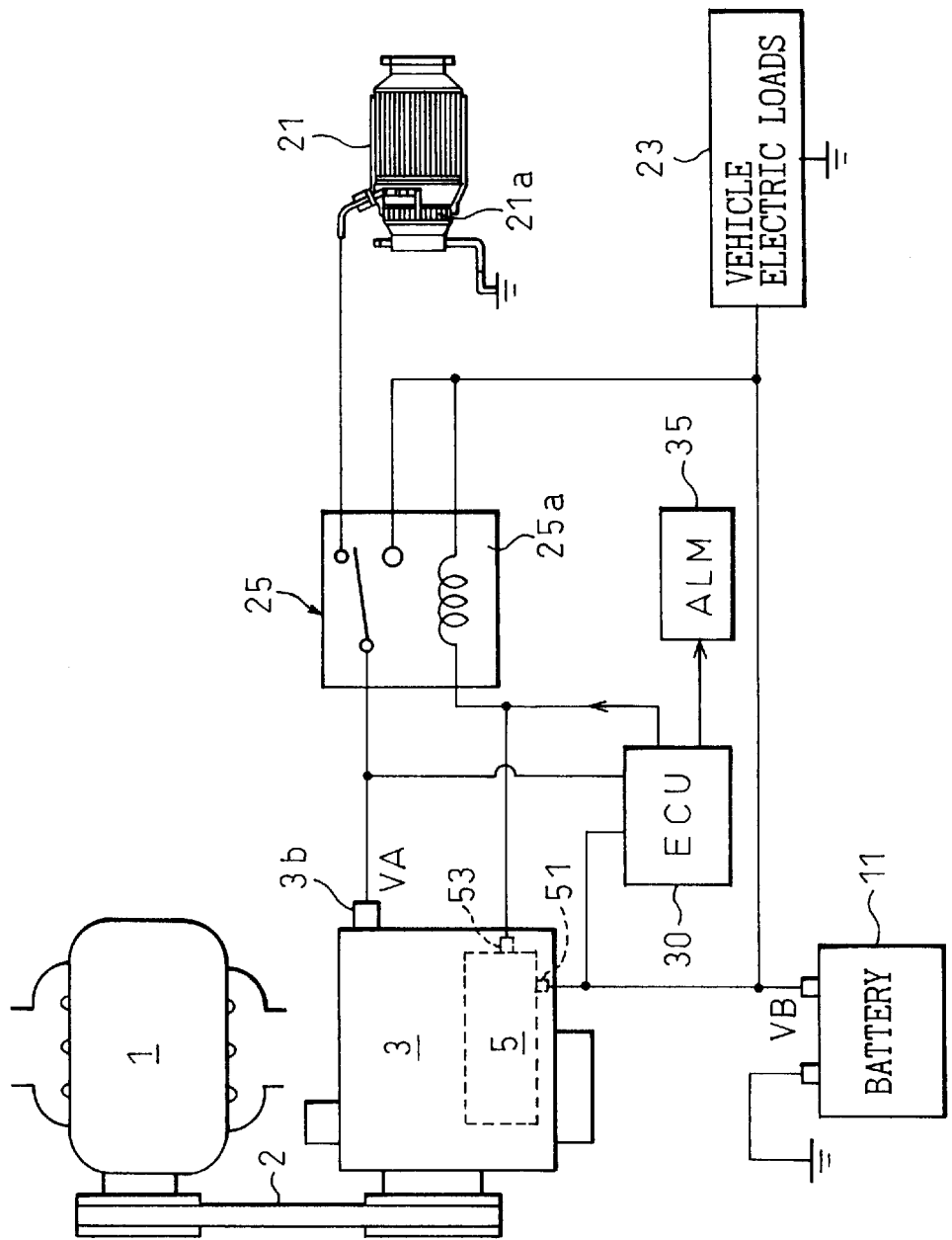
FIG. 1 schematically illustrates the general configuration of an embodiment of the present invention when it is applied to a changeover switch of a vehicle power supply system.

FIG. 1 shows a general configuration of an embodiment of the present invention when it is applied to a power supply system of a vehicle.

In FIG. 1, reference numeral 1 designates an internal combustion engine of a vehicle, and numeral 3 designates a three-phase AC generator (an alternator) driven by an output shaft of the engine 1 via a belt 2.

In this embodiment, the alternator 3 is provided with a built-in diode rectifier (not shown in the drawing) which converts a three-phase AC output of stator coils of the alternator 3 into a DC output and supplies it to an output terminal 3b. The alternator 3 is further provided with a built-in voltage regulator 5 which controls a field current flowing through a rotor field coil of the alternator 3. The function of the regulator 5 will be explained later in detail.

In FIG. 1, numeral 11 represents a battery of the vehicle. Numeral 21 is a large electric load which is, in this embodiment, a catalytic converter with an electric heater. The catalytic converter 21 is disposed in an exhaust gas passage of the engine 1 and purifies pollutants in the exhaust gas such as HC, CO and $NO_X$. As shown in FIG. 1, the catalytic converter 21 includes an electrically heated catalytic converter (hereinafter, referred to as "an EHC") 21a. The EHC 21a comprises a metal substrate to which catalytic components are attached. When the engine 1 starts, an electric current is supplied to the EHC 21a and, the electric current flowing through the metal substrate generates heat to raise the temperature of the substrate and the catalytic components attached thereto to an activating temperature of the catalytic components. Namely, the metal substrate of the EHC 21a is used as an electric heater for raising the temperature of the catalyst so that the catalytic action thereof starts immediately after the engine is started.

In this embodiment, electric power is supplied to the EHC 21a directly from the alternator 3 in order to raise the temperature of the EHC 21a in a short time without increasing the load of the battery 11. Namely, as shown in FIGS. 1, the battery 11 and the EHC 21a are connected to the output terminal 3b of the alternator 3 via a changeover switch 25 so that the battery 11 and the EHC 21a are selectively connected to the alternator 3 by switching the changeover switch 25.

The changeover switch 25 includes a relay 25a activated by a changeover signal from an electronic control unit (ECU) 30, and takes either of a first position where it connects the battery 11 to the alternator 3 or a second position (the position as shown in FIG. 1) which connects the EHC 21a to the alternator 3 in accordance with the changeover signal. Numeral 23 in FIG. 1 represents various electric loads of the vehicle (i.e., a second electric load) such as an ignition of the engine, lamps of the vehicle, an air conditioner. The electric loads 23 in this embodiment are connected to the battery 11 and, when the changeover switch 25 takes the second position, electric power is supplied to the electric loads 23 only from the battery 11.

The ECU 30, in this embodiment, may be constructed by a microcomputer, and may comprise a central processing unit (CPU), a read-only-memory (ROM), a random-access-memory (RAM) and an input/output interface, all mutually connected by a bi-directional bus. The ECU 30 performs basic control of the engine 1 such as the fuel injection control and the ignition control and, in this embodiment, also acts as various means in the claims such as the switching control means for turning on and off a changeover signal and the failure determining means for determining whether the changeover switch has failed.

In order to perform this control, an output voltage VA of the alternator 3 and a battery voltage VB are supplied from the output terminal 3b and a positive electrode of the battery 11, respectively, to the input/output interface of the ECU 30 via an A/D converter (not shown). Further, the input/output interface of the ECU 30 is connected to the changeover switch 25 and a terminal 53 of the output voltage regulator 5 in order to supply the changeover signal to the changeover switch 25 and the output voltage regulator 5, respectively. The changeover signal will be explained later. Numeral 35 in FIG. 1 is an alarm indicator connected to the input/output interface of the ECU 30. The ECU 30 activates the alarm indicator 35 when it detects the failure of the changeover switch 25 to warn a driver of the vehicle that the switch 25 has failed.

Next, the function of the output voltage regulator 5 is explained.

The regulator 5 includes a control circuit and a switching transistor disposed in a field current supply circuit of the field rotor coil of the alternator (both are not shown in the drawing). The control circuit adjusts the field current supplied to the field rotor coil (hereinafter referred to as "the rotor coil") by turning on and off the switching transistor. Namely, the regulator 5 controls the output voltage of the alternator 3 by adjusting the field current using the control circuit. A terminal 53 of the regulator 5 is connected to the input/output interface of the ECU 30 to receive the changeover signal from the ECU 30. In this embodiment, when the changeover signal is not received at the terminal 53 (off), i.e., when the battery 11 is connected to the alternator 3, the control circuit of the regulator 5 turns off the switching transistor to cut off the field current if the voltage of the battery 11 becomes higher than a predetermined charging voltage (for example, 14 V) and turns on the switching transistor to supply the field current to the rotor coil if the battery voltage becomes lower than the charging voltage. Therefore, in the normal operation (i.e., when the changeover switch 25 is set at the first position where it connects the battery 11 to the alternator 3), the output voltage VA of the alternator (i.e., the battery voltage VB in this case) is controlled to the predetermined charging voltage by the on/off operation of the switching transistor. Therefore, overcharging of the battery 11 can be prevented. In order to perform this 'constant output voltage operation" of alternator 3, the battery voltage VB is supplied to a terminal 51 of the regulator 5.

On the other hand when the changeover signal is received at the terminal 53 (on), the regulator 5 stops the constant output voltage operation and holds the switching transistor in the on state. In this case, the field current supplied to the rotor coil becomes its maximum value and the output voltage of the alternator 3 largely increases. This operation is hereinafter referred to as "a high output voltage operation" of the alternator.

In this embodiment, the ECU 30 turns off the changeover signal and sets the changeover switch 25 at the first position where it connects the battery 11 to the alternator 3. Therefore, the constant voltage operation of the alternator 3 is performed so that the output voltage of the alternator 3 is controlled at a relatively low charging voltage (about 14 V) during the normal operation. On the other hand, when it is required to supply electric power to the EHC 21, the ECU 30 turns on the changeover signal and switches the changeover switch 25 to the second position where it connects the EHC 21a to the alternator 3. In this condition, since the output voltage of the alternator 3 is largely raised by the regulator 5, a large amount of electric power is supplied to the EHC 21. In this embodiment, the output voltage when the alternator supplies electric power to the EHC 21a (when the changeover signal is on) is set at about 25 V.

As explained above, the charging of the battery 11 and the activation of the EHC 21a are controlled by switching operation of the changeover switch 25. However, the changeover switch 25 is liable to sticking caused by the welding of the contacts in the switch due to a large electric current flowing through the contacts. Further, the sticking of the changeover switch 25 may occur due to other causes such as improper function of other mechanical parts of the switch 25. If the sticking of the changeover switch occurs, various problems occur.

For example, if the sticking occurs at the first position of the changeover switch 25, the connection between the battery 11 and the alternator 3 is maintained even though the changeover signal is turned on. In this case, since alternator 3 is operated in the high output voltage mode when the changeover signal is on, the battery voltage becomes excessively high and overcharging of the battery may occur. On the other hand, if the changeover switch 25 sticks at the second position where it connects the EHC 21a to the alternator 3, the battery 11 is not connected to the alternator 3 even though the changeover signal is turned off. Therefore, the battery 11 continues to supply electric power to other electric loads 23 while it is disconnected from the alternator 3 and an excessive discharge of the battery may occur. Further, the battery voltage becomes lower than the charging voltage in this condition. Since the regulator 5 controls the output voltage of the alternator 3 in accordance with the battery voltage in order to keep the battery voltage at the charging voltage, the regulator 5 continuously increases the output voltage of the alternator 3. Thus, the output voltage of the alternator 3 is kept at its maximum value and, since large electric power is continuously supplied to the EHC 21a for a long time, an overheating of the EHC 21a may occur.

Further, since the failure of the changeover switch 25 does not largely affect the operation of the vehicle, the driver may not notice the failure and may continue driving. This may cause damages of the EHC 21a or the battery 11.

In order to prevent this problem, the failure detecting device in the present invention detects the failure of the changeover switch 25 by a method explained below.

First, the detecting operation of the sticking of the changeover switch 25 at the first position will be explained.

In this embodiment, switching of the changeover switch 25 is carried out in the condition wherein power generation of the alternator is temporarily terminated. Since a large electric current is flowing through the changeover switch 25 when power is generated by the alternator 3, the changeover switch 25 is liable to welding of the contacts if the switching is carried out when the alternator 3 generates power. Therefore, in this embodiment, power generation of the alternator 3 is temporarily terminated when the switching of the changeover switch 25 is carried out. More specifically, the regulator 5 in this embodiment terminates power generation of the alternator 3 by holding the switching transistor in the off state for a predetermined changeover time when the ECU 30 turns on or turns off the changeover signal and, when the changeover time has lapsed, the regulator 5 restarts power generation of the alternator 3 in the mode corresponding to whether the changeover signal is on or off. The above-noted changeover time is set at a time longer than the time required for the output voltage of alternator 3 to become sufficiently low after power generation has been terminated in order to prevent the welding of contacts in the switch 25.

Therefore, if the changeover switch 25 operates normally, the voltage of the output terminal 3b of the alternator 3 (output voltage of the alternator 3) becomes low a short time after power generation has been terminated. However, if the changeover switch 25 sticks at the first position where it connects the battery 11 to the output terminal 3b of the alternator 3, the battery voltage is imposed on the terminal 3b. In this condition, therefore, the output voltage (the voltage of the output terminal 3b) of the alternator 3 does not become lower than the battery voltage even if power generation of the alternator 3 is completely terminated.

Thus, if the voltage of the output terminal 3b does not become lower than the battery voltage VB when a certain time has lapsed after the changeover switch 25 was switched from the first position to the second position, it is considered that the changeover switch 25 has stuck at the first position.

In this embodiment, the ECU 30 detects the output voltage of the alternator 3 when a predetermined time has lapsed after it turned on the changeover signal, and determines that the changeover switch 25 has stuck at the first position if the detected output voltage is not lower than the predetermined value.

Figure 2:
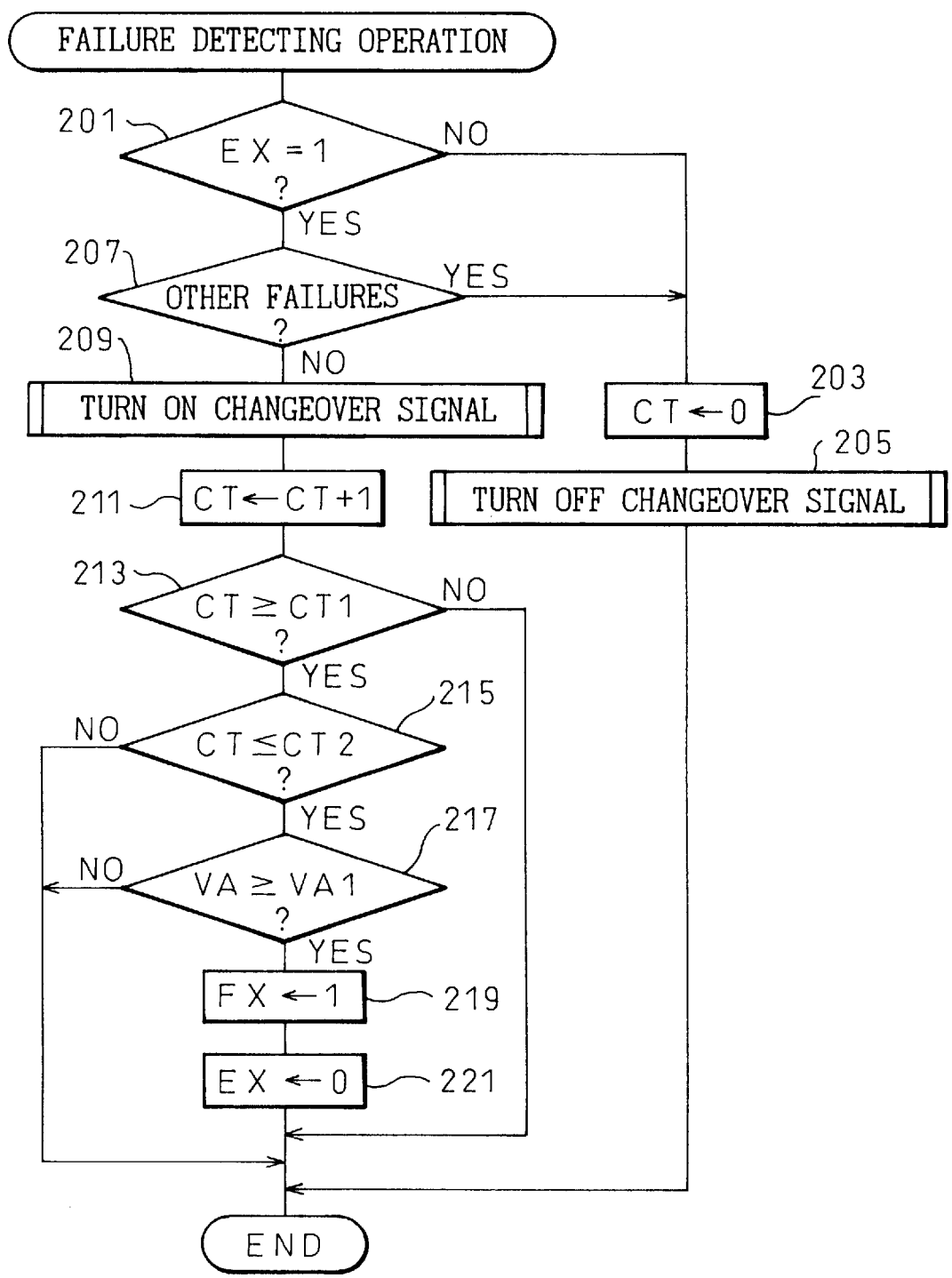
FIG. 2 is a flowchart explaining an embodiment of the failure detecting operation of the changeover switch.

FIG. 2 is a flowchart explaining the failure detecting operation as explained above. This operation is performed by a routine executed by the ECU 30 at predetermined intervals.

In FIG. 2, at step 201, the routine determines whether the EHC activation flag EX is set at 1. The value of the flag EX is set at 1 when it is required to supply electric power to the EHC 21 by a routine (not shown) separately performed by the ECU 30. If EX≠1 at step 201, the routine performs step 203 to clear the value of a counter CT, and step 205 to turn off the changeover signal to be supplied to the output voltage regulator 5 and the changeover switch 25 before the routine terminates.

If the value of the flag EX is set at 1 at step 201, since the activation of the EHC 21a is required, the routine performs step 207 to determine whether the elements in the power supply system other than the changeover switch 25 are normal. At step 207, for example, it is determined whether the regulator 5 has not failed and whether the battery voltage is higher than a predetermined value. If any of these conditions is not satisfied at step 207, the routine terminates after performing steps 203 and 205.

If all of the conditions are satisfied at step 207, the changeover signal of the ECU 30 is turned on at step 209. When the changeover signal is turned on, the changeover switch 25 takes the second position where it connects the EHC 21a to the alternator 3 if the changeover switch 25 operates normally. Further, when the changeover signal is turned on, the regulator 5 terminates power generation for a predetermined changeover time and restarts the power generation in the high output voltage mode of the alternator 3 after the changeover time has lapsed.

After turning on the changeover signal at step 209, the routine increases the value of the counter CT by 1 at step 211. Since the value of the counter is always cleared at step 203 as long as the value of the flag EX is 0, the value of the counter CT after it is increased represents the time lapsed after the changeover signal was turned on.

At step 213, the routine determines whether the value of the counter CT reaches a predetermined value CT1, i.e., whether a predetermined time corresponding to CT1 has elapsed after the changeover switch 25 was turned on and, if it has not elapsed (if CT<CT1), the routine terminates immediately without executing steps 215 through 221. The value CT1 is the number of the execution of the routine which corresponds to a time sufficient for the output voltage VA of the alternator 3 to become lower than the battery voltage and, for example, is about 100 ms in this embodiment.

If the predetermined time has lapsed at step 213, the routine determines whether the value of the counter CT has reached another predetermined value CT2 at step 215. The value CT2 is the number of the execution of the routine which corresponds to the changeover time explained before, and is set at a value corresponding to a time between 500 ms to 1 second in this embodiment. If CT>CT2 at step 215, since this means that the step 217 (which is explained later) was already performed and that the failure was not detected in the previous executions of the routine, the routine terminates without performing step 217 again.

If CT≦CT2 at step 215, since this means that power generation is terminated and the time sufficient for output voltage VA to decrease has lapsed, the routine proceeds to step 217 to determine whether the output voltage VA of the alternator 3 is higher than a predetermined value VA1. The value VA1 is set at a lower limit (10 V) of the normal voltage range (for example, 10 to 14 V) of the battery.

If VA<VA1 at step 217, this means that the output voltage VA has decreased after the termination of power generation in the normal manner. Therefore, the routine determines that the changeover switch 25 has not failed and terminates immediately. On the other hand, if VA≧VA1 at step 217, since the output voltage VA of the alternator is still high even though power generation has been terminated, it is considered that the changeover switch 25 has stuck at the first position. In this case, therefore, the routine sets the value of the flag FX to 1 at step 219 and sets the value of the flag EX to 0 at step 221. This causes the routine to proceed from step 201 to step 203 from the next execution of the routine and the EHC 21a is not activated.

The flag FX set at step 219 is a failure flag of the changeover switch 25 and FX=1 means that the changeover switch 25 has stuck at the first position. When the value of the flag FX is set at 1, the alarm indicator 35 is activated by a routine performed by the ECU 30 separately in order to notify the driver that the failure of the changeover switch 25 has occurred. The value of the flag FX may be stored in a backup RAM, if any, which is able to maintain its memory even if a main switch of the vehicle engine is turned off, in order to prepare for the inspection and repair in the future.

Next, another embodiment of the failure detecting operation for detecting the sticking of the changeover switch 25 at the first position will be explained.

In the previous embodiment, the failure of the changeover switch 25 is detected based on the output voltage of the alternator 3 during the period in which power generation is terminated. However, in this embodiment, the ECU 30 detects the failure of the changeover switch 25 by monitoring the battery voltage VB after the changeover switch 25 was switched.

As explained before, the output voltage regulator 5 increases the output voltage VA of the alternator 3 when the changeover signal is turned on. Therefore, the output voltage VA of the alternator becomes higher (about 25 V) than the normal battery charging voltage (about 14 V) after the changeover switch 25 is switched from the first position to the second position. If the changeover switch 25 operates normally, this high output voltage is not imposed on the battery 11 since the battery 11 is disconnected from the alternator 3 by the changeover switch 25. However, if the changeover switch 25 is stuck at the first position, the high output voltage of the alternator is started in the condition wherein the battery 11 is connected to the alternator 3 and battery voltage VB becomes higher than the normal charging voltage.

In this embodiment, therefore, the ECU 30 determines that the changeover switch 25 has stuck at the first position if the battery voltage VB becomes higher than the normal charging voltage when the changeover signal is on.

Figure 3:
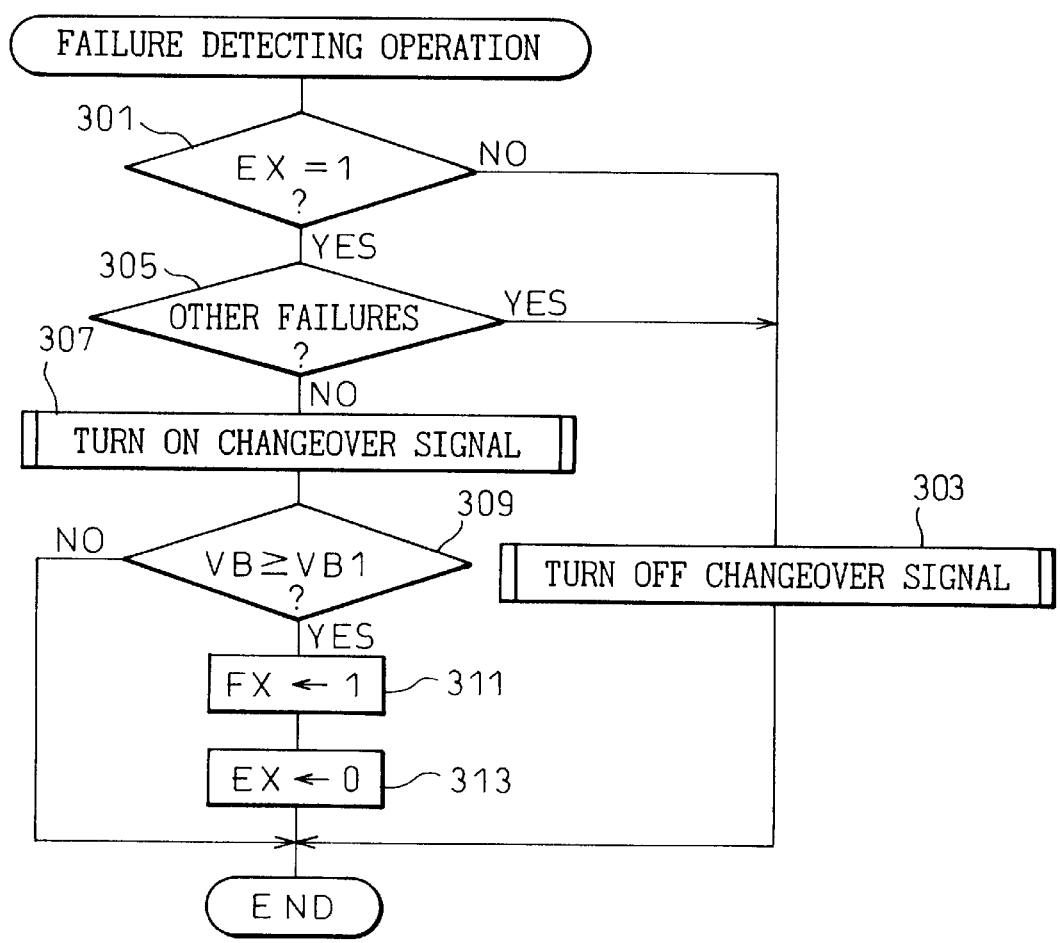
FIG. 3 is a flowchart explaining another embodiment of the failure detecting operation of the changeover switch.

FIG. 3 is a flowchart explaining the failure detecting operation of the changeover switch 25. This operation is performed by a routine executed by the ECU 30 at predetermined intervals.

In FIG. 3, at step 301, the routine determines whether the value of the EHC activation flag EX is set at 1. The function of the flag EX is exactly the same as that in FIG. 2, and if EX≠1 at step 301, the routine terminates immediately after turning off the changeover signal at step 303. Namely, electric power is not supplied to the EHC 21a when the value of the flag EX is set at 1.

If EX=1 at step 301, the routine determines at step 305 whether the elements in the power supply system other than the changeover switch 25 are normal, and if failure has occurred in other elements, the routine terminates after performing step 303. Namely, electric power is not supplied to the EHC 21a also in this case.

The determination performed at step 305 is the same as that in step 207 in FIG. 2. If other elements are normal at step 305, ECU 30 turns on the changeover signal supplied to the output voltage regulator 5 and the changeover switch 25 at step 307. Therefore, by executing step 307, the high output voltage operation of the alternator 3 is carried out and the output voltage VA of the alternator becomes higher than the battery charging voltage. In this condition, the routine then determines whether the battery voltage VB is higher than a predetermined voltage VB1. The voltage VB1 is set at a value lower than the output voltage of the alternator during the high output voltage operation (about 25 V) by a margin for positive determination and, in this embodiment, the voltage VB1 is set at about 20 V.

If VB≧VB1 at step 309, since this means that the high output voltage of the alternator 3 during the high output voltage operation is imposed on the battery 11, it can be determined that the changeover switch 25 has stuck at the first position. In this case, therefore, the routine sets the value of the failure flag FX to 1 at step 311, and sets the value of the EHC activation flag EX to 0 at step 313. The function of the flag FX is the same as that explained in FIG. 2. Since the value of the flag EX is set to 0, the routine performs step 303 after step 301 from the next execution and electric power supply to the EHC 21a is terminated.

If VB<VB1 at step 309, since it is considered that the changeover switch 25 has not stuck at the first position, the routine immediately terminates without setting the value of the failure flag FX to 1. In this case power supply to the EHC 21a is continued.

According to the embodiment explained in FIGS. 2 and 3, since the sticking of the changeover switch 25 at the first position can be detected correctly by simple methods, overcharging of the battery does not occur.

Next another embodiment of the failure detecting operation will be explained. Although the failure in which the changeover switch 25 sticks at the first position is detected in the failure detecting operation of the previous embodiments, the failure detecting operation in this embodiment detects the failure in which the changeover switch 25 has stuck at the second position.

In this embodiment, the ECU 30 determines that the changeover switch 25 has stuck at the second position where it connects the EHC 21a to the alternator 3 if the output voltage VA of the alternator 3 is higher than the battery charging voltage when a predetermined time has lapsed after the changeover signal was turned off.

As explained before, when the changeover signal is turned off, the changeover switch 25 is set to the first position and the constant output voltage operation in which the output voltage of the alternator is controlled in accordance with the battery voltage VB is performed. Therefore, if the changeover switch 25 operates normally, the output voltage VA of the alternator is controlled to the battery charging voltage. However, if the changeover switch 25 sticks at the second position, the output voltage of the alternator 3 is controlled in accordance with the battery voltage VB even though the battery is not connected to the alternator 3. In this condition, since the battery 11 continues to supply electrical loads 23 of the vehicle without receiving electric power from the alternator 3, the battery voltage VB becomes lower than the normal battery charging voltage (for example, 14 V). Therefore, the output voltage regulator 5 increases the field current of the alternator 3 in order to increase the battery voltage VB to the charging voltage. However, since the changeover switch 25 has stuck at the second position, the battery 11 is disconnected from the alternator 3 and the battery voltage VB stays at a value lower than the charging voltage even if the output voltage of the alternator 3 increases. Therefore, the regulator 5 continues to increase the field current until the field current reaches its maximum value. Namely, when the changeover switch 25 sticks at the second position, the alternator continues to supply its maximum electric power to the EHC 21a though the changeover signal is turned off.

Therefore, if the output voltage VA of the alternator 3 is higher than the battery charging voltage when a predetermined time has lapsed after the changeover signal was turned off, it can be considered that the changeover switch 25 has stuck at the second position. The above-noted predetermined time is, for example, set at a time sufficient for the output voltage regulator 5 to adjust the output voltage VA to the battery charging voltage when the changeover switch operates normally.

When the sticking of the changeover switch 25 at the second position is detected, the EHC 30 activates the alarm indicator 35 to notify the driver that the changeover switch has failed as explained in the previous embodiments. In addition to that, the ECU 30 reduces the amount of power generated by the alternator and reduces the electric power consumption of the electrical loads 23 in this embodiment.

The reason why the amount of power generation of the alternator is reduced is that if a large electric power is continuously supplied to the EHC 21a, overheating of the EHC 21a may occur. Therefore, when the changeover switch 25 has stuck at the second position, the ECU 30 controls the output voltage of the alternator 3 to a predetermined low voltage (for example, 5 V) by controlling the on/off operation of the switching transistor 5a of the regulator 5 in accordance with the engine speed (i.e., the alternator speed). The output voltage of the alternator may be controlled by controlling the engine speed (the alternator speed), instead of the field current as explained above, at a predetermined speed. In this case, the above-noted predetermined speed is set at a speed where the output voltage of the alternator decreases to a sufficiently low voltage even under the maximum field current condition.

The reason why the electric power consumption of the vehicle electrical loads 23 is reduced is to prevent an excessive discharge of the battery 11. In this case, electric power is supplied only to the vehicle electric load inevitable to the vehicle operation (such as an ignition system and a fuel injection pump) and the supply of the electric power to other electric load (such as an air conditioner and an audio system) is terminated. By reducing the power consumption of the vehicle electric loads, since the load on the battery becomes low, the vehicle can travel a longer distance when the failure occurs.

Further, when the sticking of the changeover switch 25 at the second position is found, the ECU 30 monitors the output voltage VA of the alternator 3 at predetermined intervals (for example, several seconds) after performing the reduction of the amount of the power generation and the electric power consumption of the vehicle electric loads. In this condition, if the output voltage VA becomes larger than a predetermined value, the ECU 30 restarts the constant output voltage control of the alternator and the normal supply of electric power to the vehicle electric loads.

As explained above, the output voltage VA is controlled to a low voltage (for example, 5 V) when the sticking of the changeover switch 25 occurs. However, in some cases, the changeover switch recovers from the sticking due to the vibration of the engine etc. after it has stuck. If the changeover switch recovers from the sticking, since the changeover signal is off, the changeover switch 25 switches to the first position where it connects the battery 11 to the output terminal 3b of the alternator 3. This causes the output voltage at the terminal 3b to increase to the battery voltage VB. Therefore, in this embodiment, the EHC 30 determines that the changeover switch 25 has recovered from the failure when the output voltage VA becomes higher than a predetermined value after the changeover switch 25 sticks at the second position, and restarts the normal constant output voltage operation of the alternator to charge the battery 11.

Figure 4:
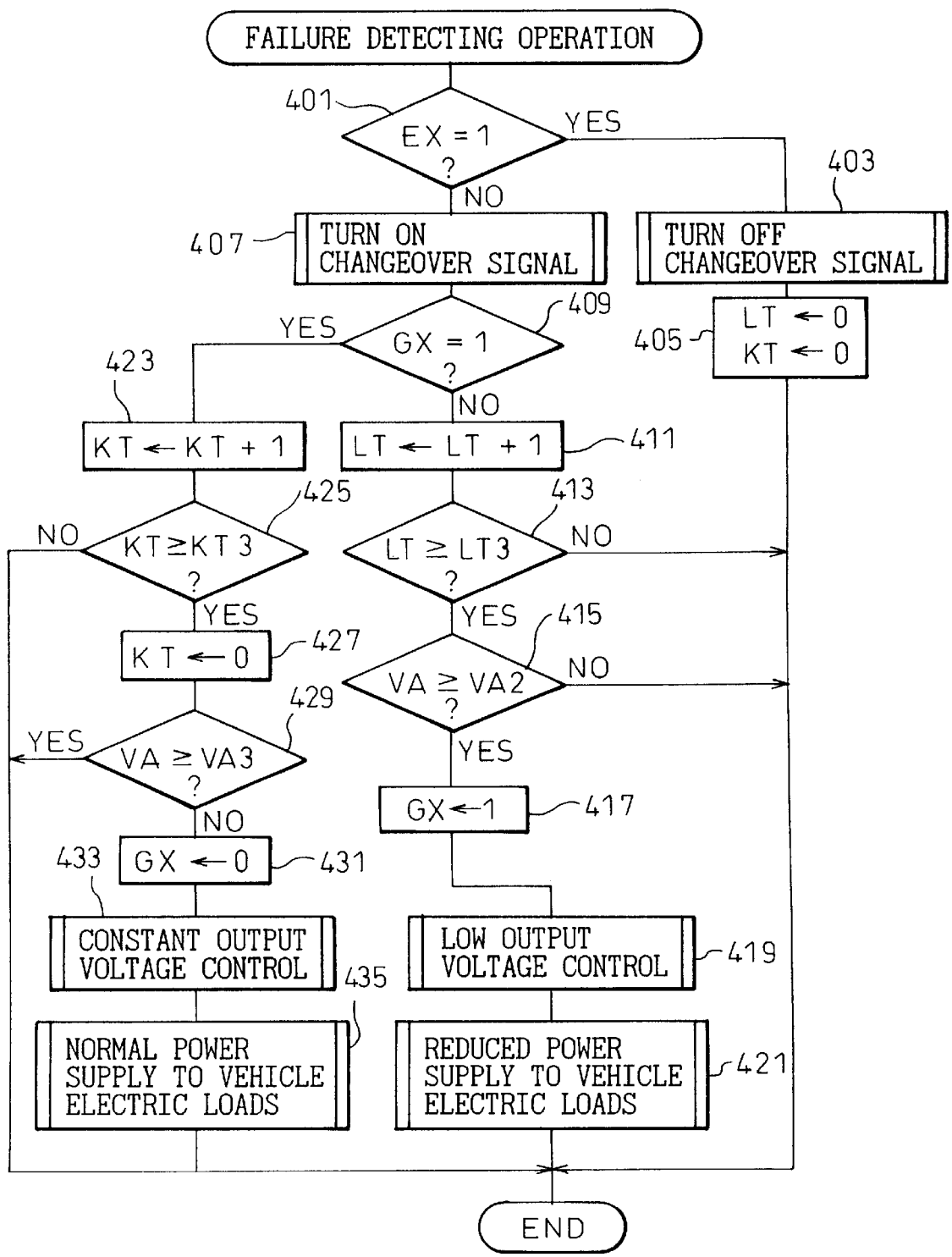
FIG. 4 is a flowchart explaining another embodiment of the failure detecting operation of the changeover switch.

FIG. 4 is a flowchart explaining the failure detecting operation explained above. This operation is carried out by a routine executed by the ECU 30 at predetermined intervals.

In FIG. 4, the routine determines whether the value of the EHC activation flag EX is 1 at step 401. If EX=1 at step 401, the routine turns on the changeover signal at step 403 and clears the values of counters LT and KT at step 405. The counters LT and KT will be explained later.

If EX≠1 at step 401, the routine executes step 407 to turn off the changeover signal, and step 409 to determine whether the value of a failure flag GX is 1. The value of the flag GX represents whether the changeover switch 25 has stuck at the second position. GX=1 indicates that the changeover switch 25 has stuck at the second position. As explained later, the value of the flag GX is set at 1 at step 417 when the sticking of the changeover switch 25 occurs.

If GX≠1 at step 409, i.e., if the sticking of the changeover switch 25 was not already found, the routine executes steps 411 through 415 to determine whether sticking of the changeover switch 25 at the second position has occurred. Namely, the routine increases the value of the counter LT by 1 at step 411, and determines whether the value of the counter LT has reached a predetermined value LT3 at step 413. Since the routine clears the value of the counter at step 405 as long as the value of the flag EX is set at 1, the value of the counter LT at step 413 represents the time has lapsed since the changeover signal was turned off at step 407. The value of the LT3 in this embodiment corresponds to about 1 second.

If it is determined that about 1 second has lapsed after the changeover signal was turned off (i.e., LT≧LT3) at step 413, the routine executes step 415 to determine whether the output voltage VA of the alternator 3 has become higher than a predetermined value VA2. VA2 is a voltage higher than the battery charging voltage by an appropriate margin, and is set at about 20 V in this embodiment.

If VA≧VA2 at step 415, since it is considered that the changeover switch 25 has stuck at second position as explained before, the routine sets the value of the failure flag GX to 1 at step 417. In this case, the routine further lowers the amount of power generation of the alternator at step 419 and reduces the electric power consumption of the electric loads 23 at step 421. On the other hand, if VA<VA2 at step 415, since this means that the changeover switch 25 has operated normally, the routine terminates without setting the value of the flag GX to 1.

Further, if GX=1 at step 409, i.e., if the failure of the changeover switch 25 was already found in the previous executions of the routine, the routine executes steps 423 through 429 to determine whether the changeover switch 25 has recovered from the failure.

Namely, at step 423, the routine increases the value of the counter KT by 1, and determines whether the value of the counter KT after it is increased has reached a predetermined value KT3 at step 425. If the value of the counter KT has reached KT3 at step 425, the routine clears the value of the counter KT at step 427, and determines whether the output voltage VA of the alternator is higher than a predetermined value VA3 at step 429. VA3 is a voltage sufficiently higher than the low output voltage of the alternator 3 during the operation after the sticking of the changeover switch 25 to the second position is found, and is set at about 10 V in this embodiment.

When VA≧VA3 at step 429, this means that the changeover switch 25 has recovered from the failure and that the switch 25 is now at the first position. Therefore, in this case, the routine resets the value of the failure flag GX to 0 at step 431, and restarts the constant voltage operation of the alternator 3 (step 433) and the normal supply of electric power to the electric loads 23. By performing steps 423 through 435, the battery charging and the normal electric power supply to the electric loads 23 are restarted as soon as the changeover switch 25 has recovered from the failure.

If VA<VA3 at step 429, since this means that the changeover switch 25 is still stuck at the second position, the routine terminates without resetting the value of the failure flag GX and the value of GX is kept at 1. In this case, the routine determines whether the changeover switch 25 has recovered from the failure (step 429) every time the value of the counter KT reaches KT3, and if the switch 25 has recovered from the failure, the routine immediately executes steps 431 through 435.

As explained above, according to this embodiment, the failure in which the changeover switch 25 is stuck at the second position is precisely determined and, if the failure is found, the operation for preventing the overheat of the EHC 21a and the excessive discharge of the battery 11 are immediately performed. Further, if the changeover switch 25 recovers from the failure, the normal battery charging operation is immediately restarted.

Though the embodiments of the detecting operations for the sticking of the changeover switch at the first position (FIGS. 2 and 3) and for the sticking thereof at the second position (FIG. 4) are separately explained, if the operation in FIGS. 2 and 3 and the operation in FIG. 4 are performed at the same time, the sticking of the changeover switch at both positions can be precisely detected.

We claim:

1. A failure detecting device for a power supply changeover switch comprising:

an electric generator;

a battery;

an electric load;

a switching control means for turning on a changeover signal when it is required to supply electric power to the electric load;

a power supply changeover switch connected to the electric generator, the battery and the electric load, and operating between a first position where it connects the battery to the generator and a second position where it connects the electric load to the generator, wherein the power supply changeover switch takes the second position when the changeover signal from the switching control means is turned on, and takes the first position when the changeover signal is turned off;

an output voltage regulator which terminates power generation of the generator for a predetermined changeover period when the changeover signal has been turned on; and a failure determining means for determining that the power supply changeover switch has failed if an output voltage of the generator is higher than a predetermined value when a predetermined time which is shorter than the changeover period has lapsed after the changeover signal was turned on.

2. A failure detecting device for a power supply changeover switch comprising:

an electric generator;

a battery;

an electric load;

a switching control means for turning on a changeover signal when it is required to supply electric power to the electric load;

a power supply changeover switch connected to the electric generator, the battery and the electric load, and operating between a first position where it connects the battery to the generator and a second position where it connects the electric load to the generator, wherein the power supply changeover switch takes the second position when the changeover signal from the switching control means is turned on, and takes the first position when the changeover signal is turned off;

an output voltage regulator which controls an output voltage of the generator so that a voltage of the battery becomes a predetermined charging voltage when the changeover signal is off and controls the output voltage of the generator to a voltage higher than the charging voltage when the changeover signal is on; and a failure determining means for determining that the power supply changeover switch has failed if a voltage of the battery is higher than a predetermined upper limit voltage when the changeover signal is on.

3. A failure detecting device for a power supply changeover switch comprising:

an electric generator;

a battery;

an electric load;

a switching control means for turning on a changeover signal when it is required to supply electric power to the electric load;

a power supply changeover switch connected to the electric generator, the battery and the electric load, and operating between a first position where it connects the battery to the generator and a second position where it connects the electric load to the generator, wherein the power supply changeover switch takes the second position when the changeover signal from the switching control means is turned on, and takes the first position when the changeover signal is turned off;

an output voltage regulator which controls an output voltage of the generator so that a voltage of the battery becomes a predetermined charging voltage when the changeover signal is off and controls the output voltage of the generator to a voltage higher than the charging voltage when the changeover signal is on; and a failure determining means for determining that the power supply changeover switch has failed if an output voltage of the generator is higher than a predetermined upper limit voltage when a predetermined time has lapsed after the changeover signal was turned off.

4. A failure detecting device for a power supply changeover switch as set forth in claim 3, wherein the battery supplies electric power to a second electric load when the changeover switch is in the second position, and wherein the failure detecting device further comprises a load reducing means for reducing a power consumption of the second electric load when the failure determining means determines that the power supply changeover switch has failed.

5. A failure detecting device for a power supply changeover switch as set forth in claim 3, further comprising voltage reducing means for reducing the output voltage of the generator when the failure determining means determines that the power supply changeover switch has failed.

* * * * *